(12) United States Patent
Kinoshita et al.

(10) Patent No.: US 12,222,771 B2
(45) Date of Patent: Feb. 11, 2025

(54) ELECTRONIC APPARATUS

(71) Applicant: Lenovo (Singapore) Pte. Ltd., Singapore (SG)

(72) Inventors: Hiroaki Kinoshita, Kanagawa (JP); Kazuya Tatsuno, Kanagawa (JP); Shinichi Kubota, Kanagawa (JP); Satoshi Hosoya, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 169 days.

(21) Appl. No.: 18/167,074

(22) Filed: Feb. 10, 2023

(65) Prior Publication Data
US 2023/0280799 A1   Sep. 7, 2023

(30) Foreign Application Priority Data
Mar. 7, 2022   (JP) ................................ 2022-034335

(51) Int. Cl.
*G06F 1/16*   (2006.01)
*F16C 11/04*   (2006.01)

(52) U.S. Cl.
CPC ............ *G06F 1/1681* (2013.01); *F16C 11/04* (2013.01); *G06F 1/1616* (2013.01)

(58) Field of Classification Search
CPC .... G06F 1/1681; G06F 1/1616; G06F 1/1683; F16C 11/04
See application file for complete search history.

(56) References Cited

U.S. PATENT DOCUMENTS

| | | | | |
|---|---|---|---|---|
| 5,177,672 A | * | 1/1993 | Ito ....................... | G06F 15/0216 439/31 |
| 8,593,800 B2 | * | 11/2013 | Asakura ................ | G06F 1/1681 361/679.28 |
| 9,804,539 B2 | * | 10/2017 | Takahashi .............. | G03G 15/10 |
| 11,079,810 B2 | * | 8/2021 | Bir ......................... | G06F 1/1683 |
| 11,231,757 B2 | * | 1/2022 | Kurma Raju ........... | G06F 1/203 |

(Continued)

FOREIGN PATENT DOCUMENTS

| | | |
|---|---|---|
| JP | 2005347345 A | 12/2005 |
| JP | 2018521384 A | 8/2018 |
| JP | 2019087266 A | 6/2019 |

(Continued)

*Primary Examiner* — Anthony M Haughton
*Assistant Examiner* — Hung Q Dang
(74) *Attorney, Agent, or Firm* — Osha Bergman Watanabe & Burton LLP

(57) ABSTRACT

An electronic apparatus includes: a first chassis and a second chassis; a hinge connecting the second chassis to the first chassis in a relatively rotatable manner; an electrical device including a display provided in the first chassis; a printed circuit board provided in the second chassis; and a flexible substrate for electrically connecting the electrical device and the printed circuit board, the first chassis including a rotating body that rotates coaxially with the hinge by a rotational movement with respect to the second chassis and has the flexible substrate passed therethrough, and the rotating body including: a first opening guiding the flexible substrate to the electrical device; a second opening guiding the flexible substrate to the printed circuit board; and a substrate opening through which the flexible substrate passes.

4 Claims, 8 Drawing Sheets

(56) References Cited

U.S. PATENT DOCUMENTS

2013/0058048 A1* 3/2013 Choi .................. H04M 1/0237
361/727
2015/0049275 A1* 2/2015 Posner .................. G02F 1/1368
361/679.28

FOREIGN PATENT DOCUMENTS

| JP | 6698144 B1 | 5/2020 |
| JP | 2020205034 A | 12/2020 |
| WO | 2007121282 A2 | 10/2007 |
| WO | 2016179304 A1 | 11/2016 |

* cited by examiner

ELECTRONIC APPARATUS

CROSS-REFERENCE TO RELATED APPLICATIONS

This application claims priority to Japanese Patent Application No. 2022-34335 filed on Mar. 7, 2022, the contents of which are hereby incorporated herein by reference in their entirety.

BACKGROUND

Technical Field

The present invention relates to an electronic apparatus having a first chassis and a second chassis that are rotatably connected.

Description of Related Art

In an electronic apparatus such as a laptop PC, a first chassis with a display mounted therein and a second chassis with a motherboard mounted therein are connected by hinges as shown in, for example, Japanese Patent No. 6698144. In the electronic apparatus described in Japanese Patent No. 6698144, the wiring member connecting the first chassis and the second chassis is in the form of a thin wire routed along a rotation shaft of the hinges.

If the wiring member is routed along the rotation shaft of the hinges, the width of that portion is increased by the width of the wiring member, resulting in deteriorated appearance quality. As a possible solution, the wiring member could be routed across the opposing side surfaces of the first chassis and the second chassis rather than routing the wiring member along the rotation shaft. The first chassis and the second chassis rotate relatively to each other, so that a flexible substrate that is thin and flexible is desirably used as the wiring member rather than a wire-like member in this case.

Further, a cover is desirably provided between the first chassis and the second chassis so as to make the flexible substrate invisible to a user. Because the path of the flexible substrate changes due to relative rotation between the first chassis and the second chassis, there is a concern that if the path change is restricted by the cover, a load will be applied to that portion, thus shortening the service life of the flexible substrate.

SUMMARY

The present invention has been made in view of the above-described problem, and an object of the invention is to provide an electronic apparatus that does not shorten the service life of a flexible substrate extending from a first chassis to a second chassis.

To solve the above-described problem and achieve the object, an electronic apparatus according to a first aspect of the present invention includes: a first chassis and a second chassis; a hinge connecting the second chassis to the first chassis in a relatively rotatable manner; an electrical device including a display provided in the first chassis; a printed circuit board provided in the second chassis; and a flexible substrate for electrically connecting the electrical device and the printed circuit board, wherein the first chassis includes: a rotating body that rotates coaxially with the hinge by a rotational movement with respect to the second chassis and has the flexible substrate passed therethrough, the rotating body includes: a first opening guiding the flexible substrate to the electrical device; a second opening guiding the flexible substrate to the printed circuit board; and a substrate opening through which the flexible substrate passes, the substrate opening extends in a direction in which the first chassis and the second chassis are stacked in a folded form in which the first chassis and the second chassis are stacked together with one surface of each thereof opposing each other, and the rotating body has a first half body on a side facing the second chassis with the substrate opening sandwiched therebetween, and a second half body on a side opposite thereto, and a distal end portion forming the second opening in the first half body falls within a range of a profile of the rotation shaft member in a side view of the distal end portion observed on an extension of the rotation shaft member providing a center of rotation of the hinge. With this arrangement, the service life of the flexible substrate extending from the first chassis to the second chassis does not shorten.

Further, an electronic apparatus according to a second aspect of the present invention includes: a first chassis and a second chassis; a hinge connecting the second chassis to the first chassis in a relatively rotatable manner; an electrical device including a display provided in the first chassis; a printed circuit board provided in the second chassis; and a flexible substrate for electrically connecting the electrical device and the printed circuit board, wherein the first chassis includes: a rotating body that rotates coaxially with the hinge by a rotational movement with respect to the second chassis and has the flexible substrate passed therethrough, the rotating body includes: a first opening guiding the flexible substrate to the electrical device; a second opening guiding the flexible substrate to the printed circuit board; and a substrate opening through which the flexible substrate passes, the substrate opening extends in a direction in which the first chassis and the second chassis are stacked in a folded form in which the first chassis and the second chassis are stacked together with one surface of each thereof facing each other, the rotating body has: a first half body on a side facing the second chassis with the substrate opening sandwiched therebetween; and a second half body on a side opposite thereto, and an inner side surface forming the second opening in the first half body has a distal end portion thereof closest to the center of rotation. With this arrangement, the service life of the flexible substrate extending from the first chassis to the second chassis does not shorten.

The second half body may constitute a side surface of the first chassis, and the flexible substrate may be fixed to an inner surface of a straight wall portion of the second half body, the straight wall portion forming a side surface of the first chassis. With this arrangement, the flexible substrate can be fixed without affecting the behavior in the second opening.

The rotation shaft member may be press-fitted into a part of the first chassis. This arrangement imparts a space-saving structure to the connection between the hinge and the first chassis, making it possible to bring the rotation shaft member close to the second chassis.

According to the above-described aspects of the present invention, the distal end portion constituting the second opening in the first half body is located in the range of the profile of the rotation shaft member of the hinge, or located close to the center of rotation, so that the flexible substrate does not have an extremely convex downward shape and the degree of bending becomes moderate in the folded form in which the first chassis and the second chassis are stacked together. In addition, the amount of displacement of the distal end portion of the first half body in the longitudinal direction with reference to the folded form is sufficiently small, and the change in the path angle of the flexible substrate is small. Thus, the flexible substrate undergoes small changes in posture and position when the first chassis is repeatedly rotated, so that the flexible substrate is less subject to stress, and therefore does not shorten the service life thereof.

DETAILED DESCRIPTION

The following will describe in detail an embodiment of an electronic apparatus according to the present invention with reference to the accompanying drawings. It should be noted that the present invention is not limited by the embodiment.

Figure 1:
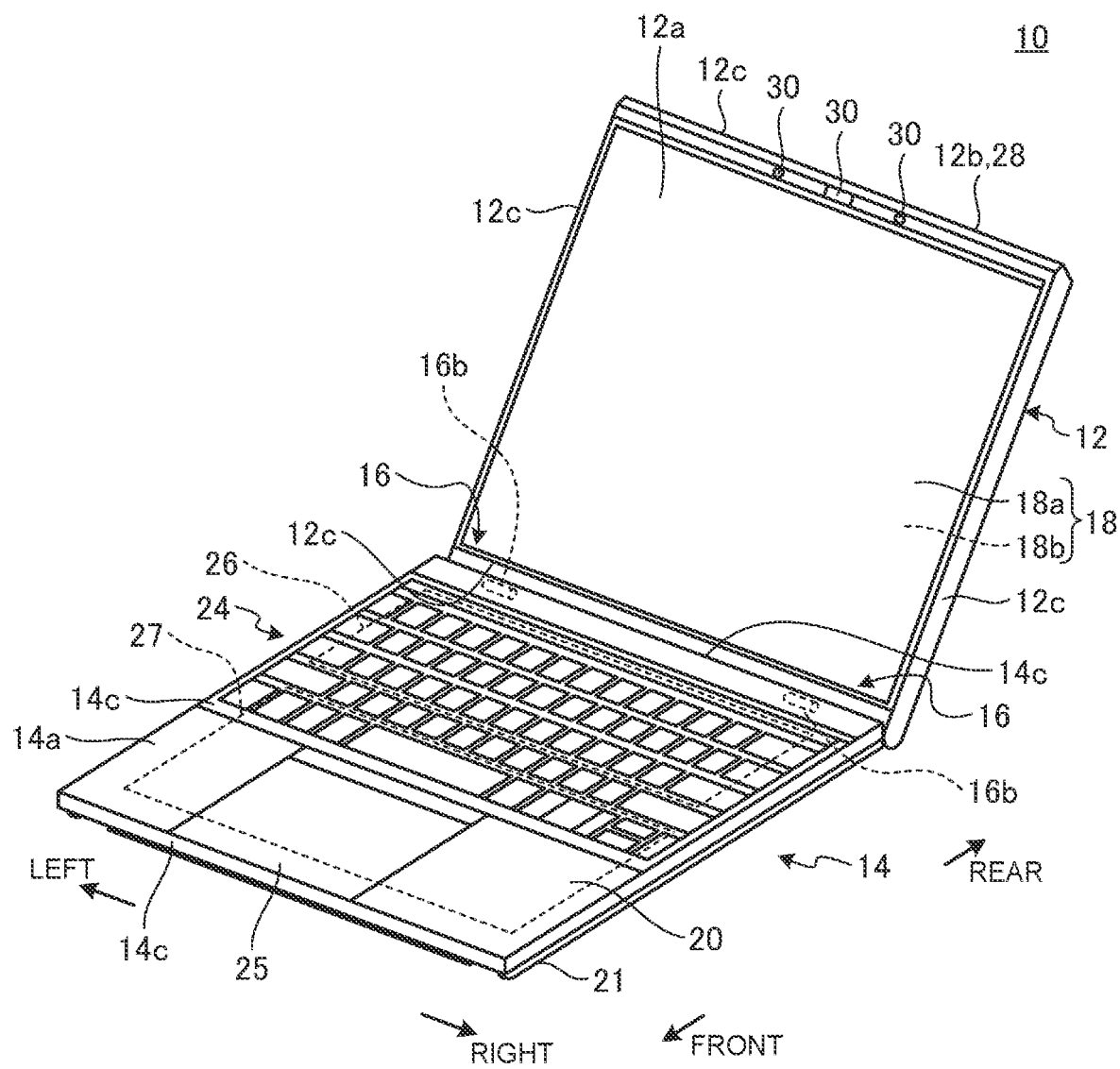
FIG. 1 is a schematic perspective view of an electronic apparatus according to an embodiment of the present invention observed from above.
Figure 5:
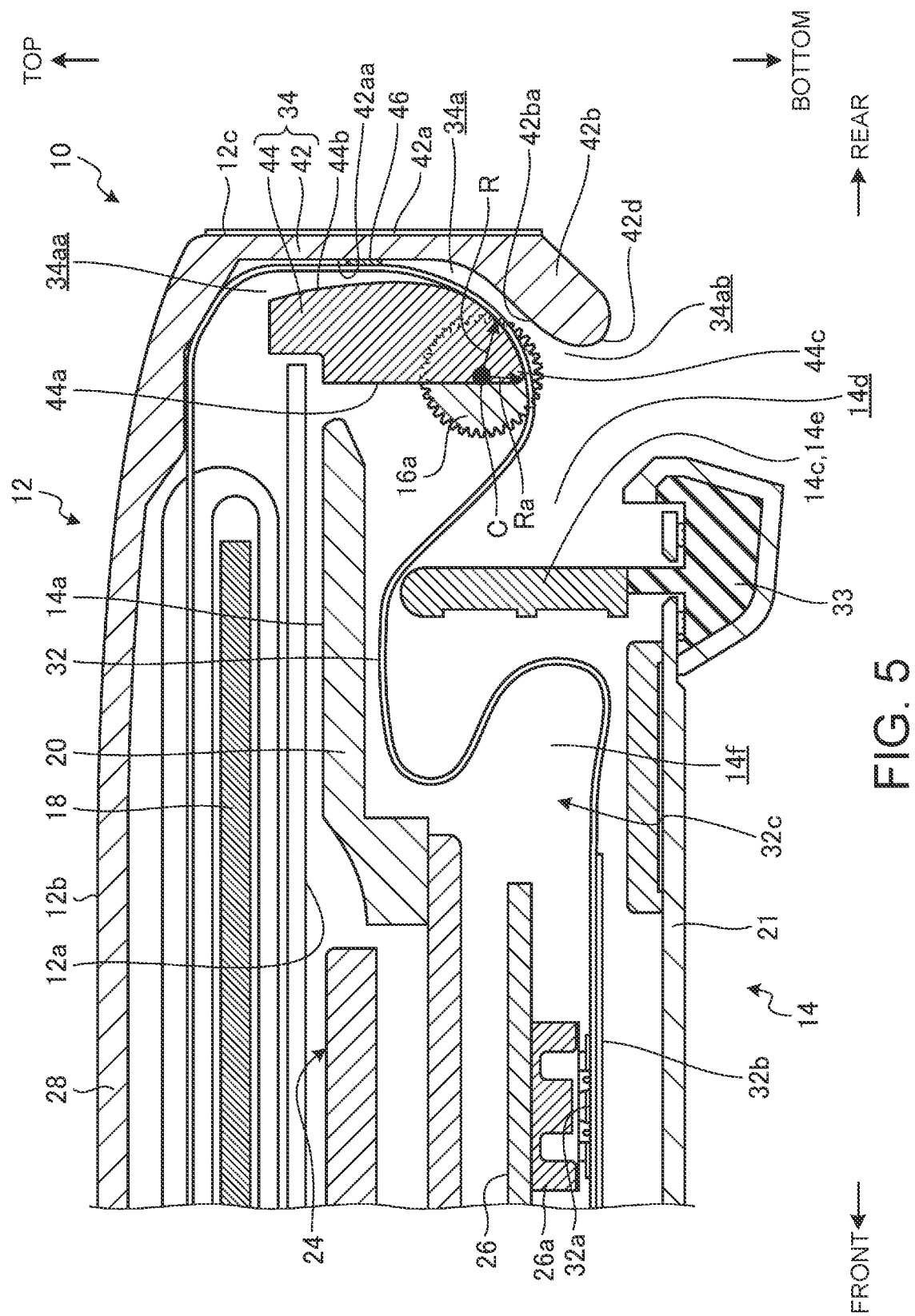
FIG. 5 is an enlarged schematic side sectional view of a rear part of the electronic apparatus in which the angle posture between the chassis has been set to zero degrees.
Figure 6:
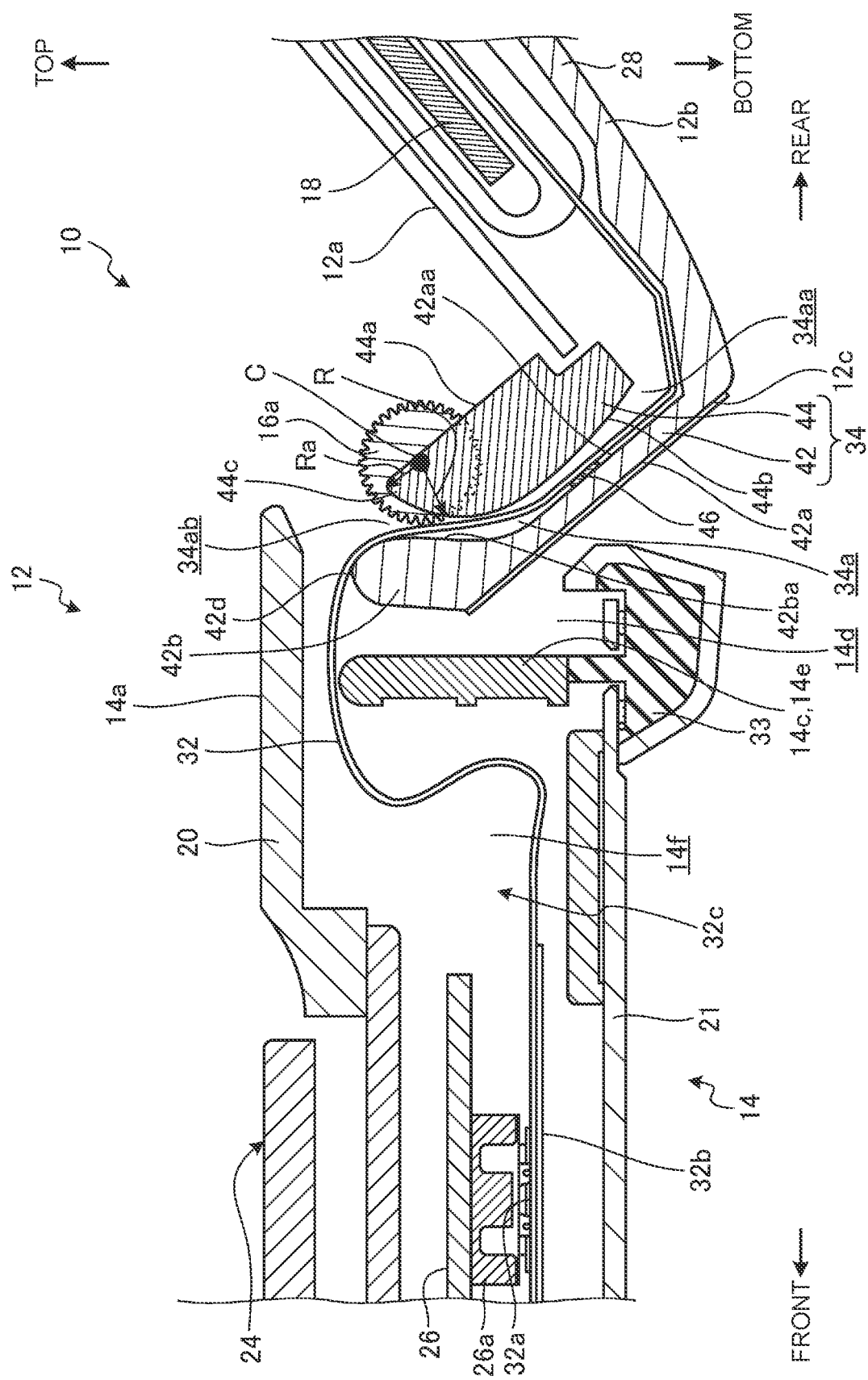
FIG. 6 is an enlarged schematic side sectional view of the rear part of the electronic apparatus in which the angle posture between the chassis has been set to 135 degrees.

FIG. 1 is a schematic perspective view of an electronic apparatus 10 according to an embodiment of the present invention observed from above. As illustrated in FIG. 1, the electronic apparatus 10 is a clamshell laptop PC in which a first chassis 12 and a second chassis 14 are connected by hinges 16 in a relatively rotatable manner. In the electronic apparatus 10, the chassis 12 and 14 are rotatable between a 0-degree posture (refer to FIG. 5) and 135-degree posture (FIG. 6). The rotation range between the chassis 12 and 14 may be 135 degrees or more. The electronic apparatus in accordance with the present invention may be a mobile phone, a smartphone, or a portable game machine or the like other than a laptop PC.

In the following description, regarding the electronic apparatus 10, based on a state in which the first chassis 12 is closed to the second chassis 14 to be in the 0-degree posture (refer to FIG. 5), the front side will be referred to as the front, the back side will be referred to as the rear, the width direction will be referred to as the lateral direction, and the thickness direction will be referred to as the vertical direction. Regarding the first chassis 12, based on a state in which the chassis 12 is opened and a display 18 is visible as illustrated in FIG. 1, the display surface side of the display 18 may be referred to as the front, the rear side of the display 18 may be referred to as the back surface, the hinge 16 side may be referred to as the bottom, and the opposite side from the hinge 16 side may be referred to as the top.

First, the overall configuration of the electronic apparatus 10 will be described.

The second chassis 14 is a flat box body. The second chassis 14 has an upper cover member 20 forming an upper surface 14a, and a lower cover member 21 forming a lower surface (bottom surface) 14b (refer to FIG. 5). Front, rear, left, and right side surfaces 14c of the second chassis 14 are formed of wall portions rising from the four peripheral edges of the upper cover member 20. A keyboard 24 and a touch pad 25 are provided on the upper surface 14a. The second chassis 14 accommodates therein various electronic components such as an SSD (Solid State Drive), a memory, and an antenna device in addition to a motherboard (printed circuit board) 26 and a battery device 27.

The first chassis 12 is a flat box body that is thinner than the second chassis 14. The display 18 is provided on a front surface 12a of the first chassis 12. The first chassis 12 has a rear cover member 28 forming a rear surface 12b. For the first chassis 12, glass and touch film integrated together, for example, may be used, and a part corresponding to a bezel may be omitted. Front, rear, left and right side surfaces 12c of the first chassis 12 are formed of the wall portions rising from the four peripheral edges of the rear cover member 28. The side surfaces 12c may be composed of a member independent of the rear cover member 28. The display 18 has a display section 18a that faces the front surface 12a and displays images, and a touch panel section 18b for touch operations. The display section 18a is composed of, for example, an organic EL (OLED: Organic Light Emitting Diode) or liquid crystal. The touch panel section 18b may be omitted.

A plurality of electrical devices 30 are provided on the edge opposite from the hinges 16 in the first chassis 12. The electrical devices 30 are, for example, a camera, a microphone, an infrared port, and the like. The display 18 is also a type of electrical device in a broad sense, so that the display 18 will be included in the electrical devices 30 hereinafter unless otherwise specified.

A pair of the hinges 16 are provided at both left and right ends. The hinges 16 (refer to FIG. 3) rotatably connect the opposing side surfaces of the first chassis 12 and the second chassis 14. Each of the hinges 16 has a rotation shaft member 16a as a base, and has a cylindrical body 16b of the first chassis 12, a torque imparting mechanism 16c, and a bracket 16d fixed to the second chassis 14. The rotation shaft member 16a is a rod-shaped member, one end of which has a splined shape and is press-fitted into the cylindrical body 16b. The torque imparting mechanism 16c is adapted to impart frictional torque to the rotation shaft member 16a such that an arbitrary rotation angle between the first chassis 12 and the second chassis 14 can be maintained.

Figure 2:
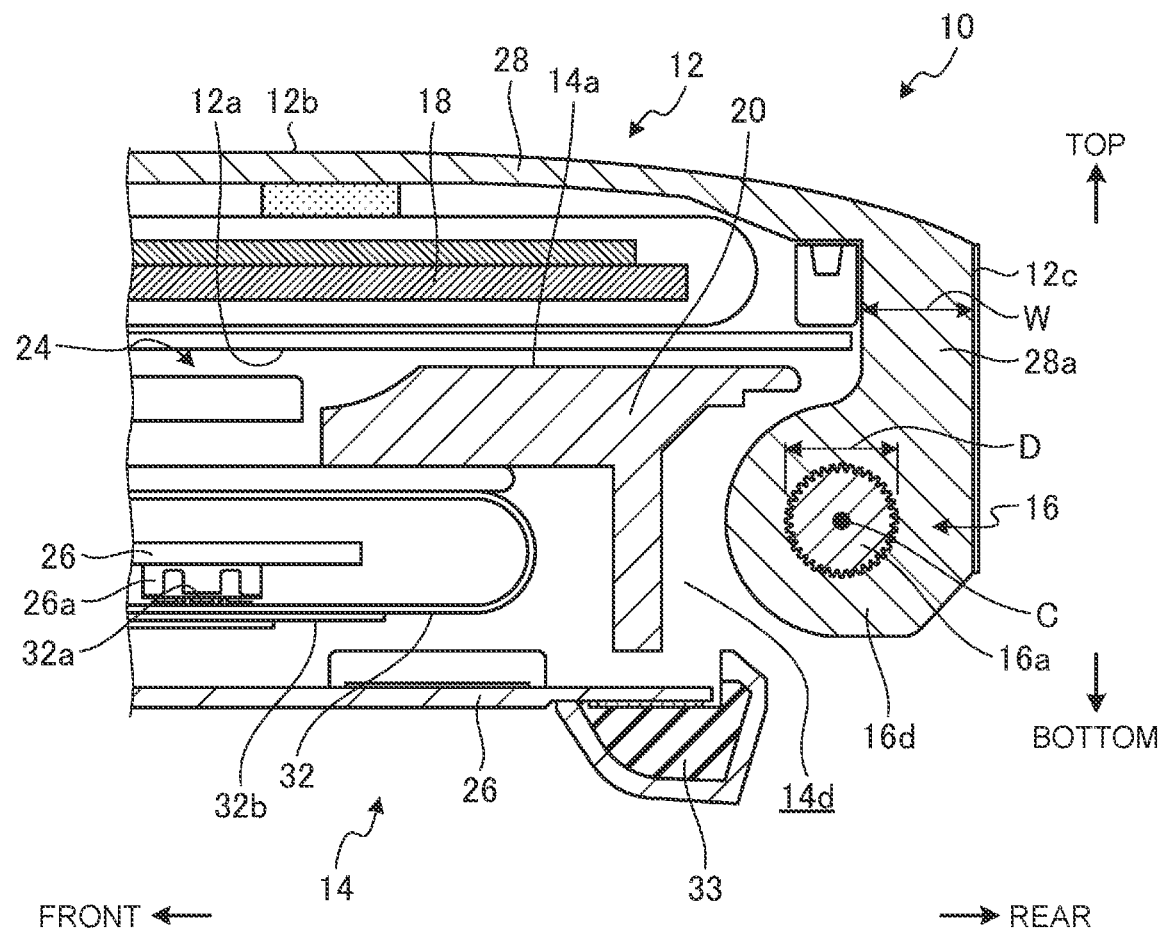
FIG. 2 is a sectional side view of an area surrounding a rotation shaft member.

FIG. 2 is a sectional side view of an area surrounding the rotation shaft member 16a. The hinge 16 is connected to the second chassis 14 through the bracket 16d, and with respect to the first chassis 12, the rotation shaft member 16a is press-fitted to the cylindrical body 16b, thus eliminating the need for any additional fastening components such as screws or brackets, and also achieving a space-saving structure. The press-fitting portion of the rotation shaft member 16a has a serrate shape. The rotation shaft member 16a is a part that is press-fitted into the cylindrical body 16b and subjected to a load due to the weight of the first chassis 12, but it is undesirable to excessively increase the size thereof. Therefore, considering the strength, a diameter D of the rotation shaft member 16a is preferably approximately 2 to 5 mm, and is set to approximately 3 mm in the present embodiment.

Further, regarding the electrical connection between the first chassis 12 and the second chassis 14, there are no wiring members along the hinge 16, so that the cylindrical body 16b can have a small diameter, and a neck portion 28a extending from the cylindrical body 16b to the rear surface 12b can be made thin. Since the neck portion 28a is formed to be thin, the rotation shaft member 16a can be brought closer to the second chassis 14 side (left side in FIG. 2) accordingly. In the case where wiring is routed along the hinge 16 as in the prior art, a thickness W of the neck portion 28a is approximately 9 mm, whereas it has been confirmed by the inventors of the present application that the thickness W of approximately 3 mm can be achieved in the electronic apparatus 10 according to the present embodiment. Reference numeral 33 in FIG. 2 denotes a rubber leg attached to the lower surface 14b of the second chassis 14.

Figure 3:
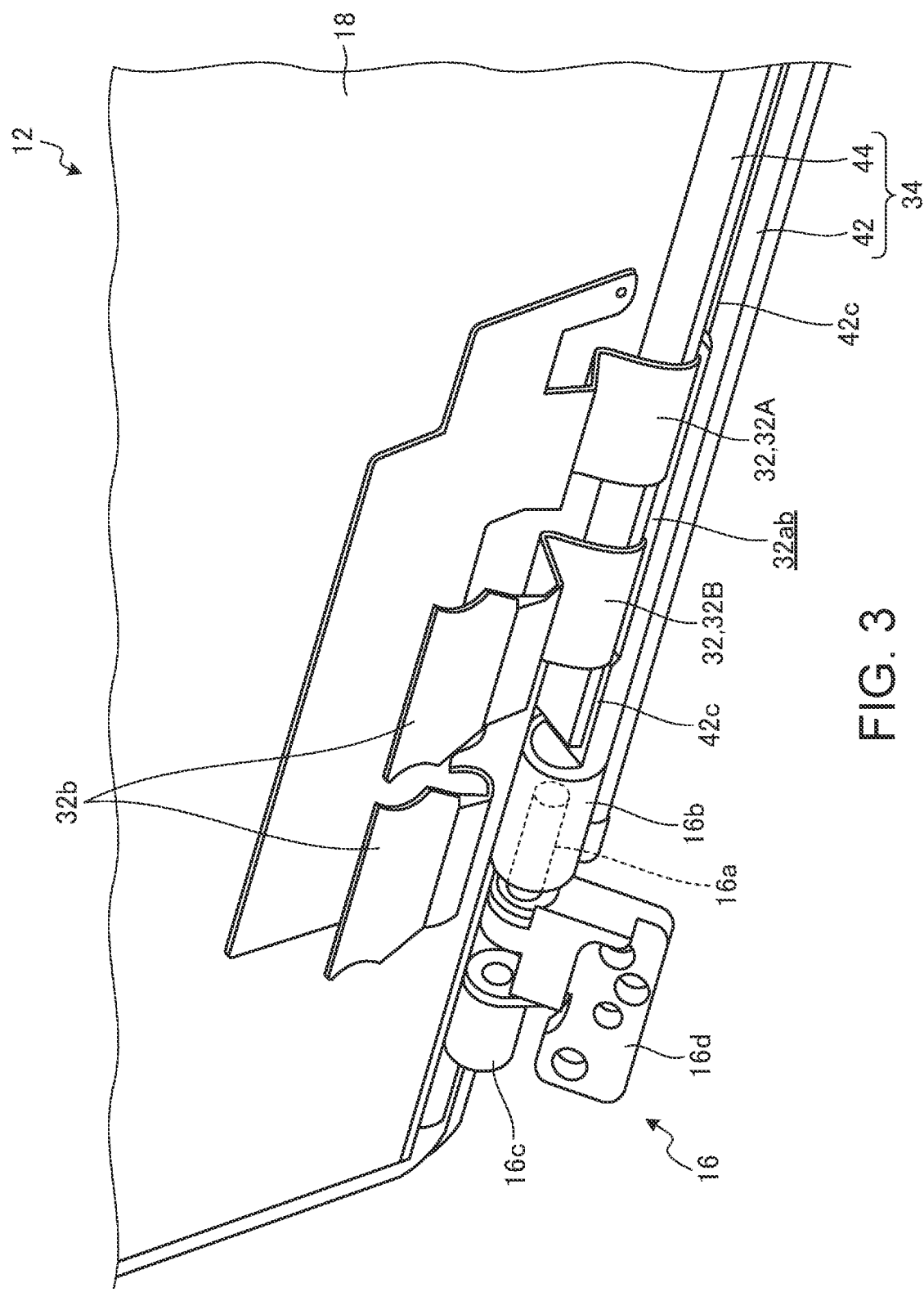
FIG. 3 is a perspective view of an end part of a single body of a first chassis observed from a front side.

FIG. 3 is a perspective view of an end part of the single body of the first chassis 12 observed from the front side. The first chassis 12 and the second chassis 14 are electrically connected by two flexible substrates 32A and 32B (hereinafter representatively referred to also as the flexible substrates 32). The flexible substrates 32A and 32B are placed side by side. In the flexible substrates 32, almost all the portions visible in FIG. 3 are accommodated in the second chassis 14. The flexible substrates 32 use, for example, flexible insulating film, and is a flexible printed circuit (FPC) formed to be thin and flexible. The flexible substrates 32 are routed to extend across the opposing side faces of the first chassis 12 and the second chassis 14. The flexible substrates 32 electrically connect the electrical devices 30 in the first chassis 12 and the motherboard 26 in the second chassis 14. The flexible substrates 32 and the electrical devices 30 may be directly connected or may be connected through a driver or a relay board.

Figure 4:
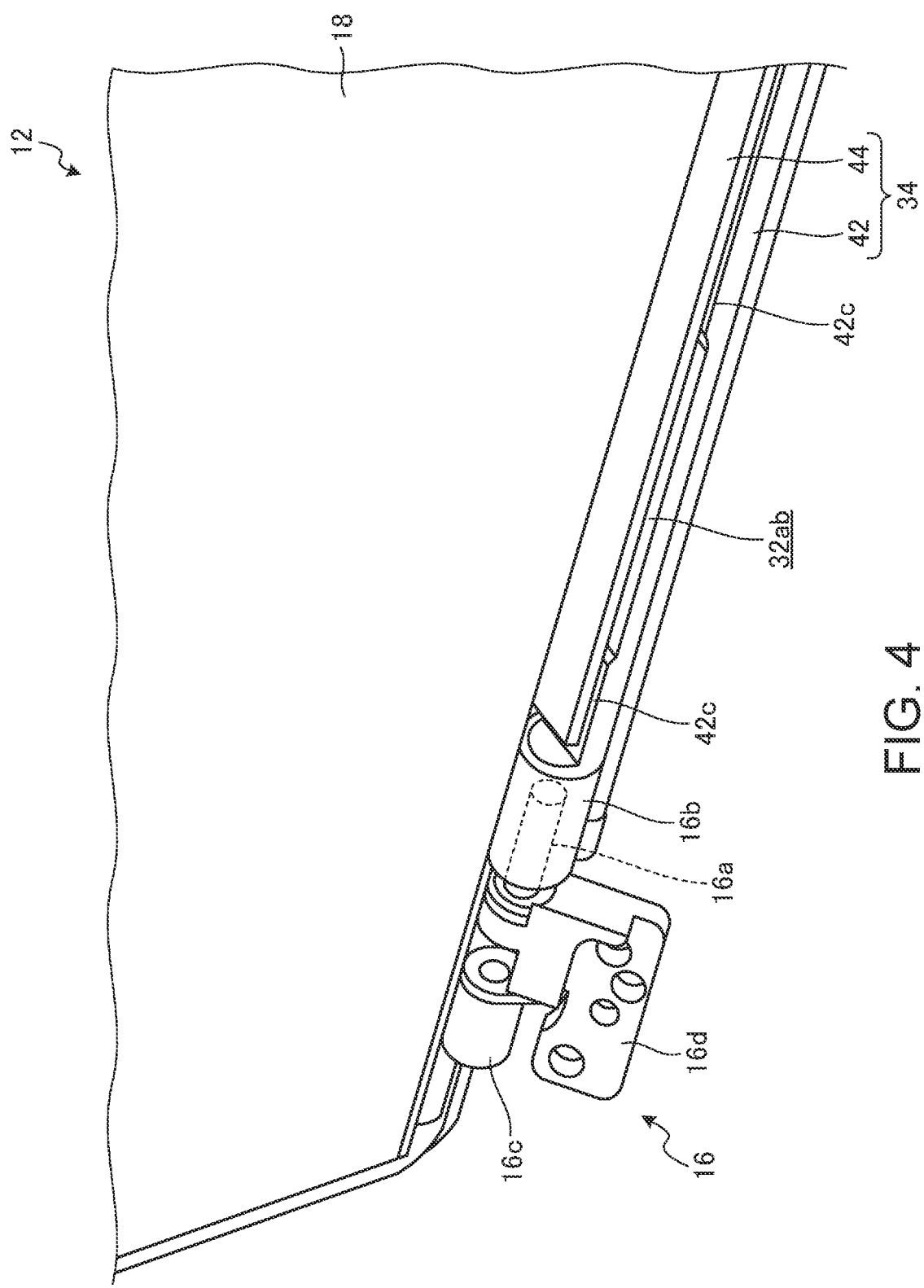
FIG. 4 is a perspective view of the same section as that of FIG. 3 with flexible substrates omitted.

FIG. 4 is a perspective view of the same section as that of FIG. 3 with the flexible substrates 32A and 32B omitted. FIG. 5 and FIG. 6 are enlarged schematic side sectional views of the rear part of the electronic apparatus 10 in which the angle posture between the chassis 12 and 14 has been set to zero degrees and 135 degrees, respectively. FIG. 5 and FIG. 6 are side views observed from the extension of the rotation shaft member 16a, which forms a rotation center C of the hinge 16.

In the second chassis 14, the upright wall of a recessed portion 14d is formed by a guide plate 14e. The upper end of the guide plate 14e and the inner surface of the upper cover member 20 together form a gap through which the flexible substrates 32 pass.

As illustrated in FIG. 4 to FIG. 6, a side wall forming section (rotating body) 34 is provided on the lower side surface 12c of the first chassis 12. The side wall forming section 34 is a part protruding perpendicularly from the front surface 12a. The side wall forming section 34 is regarded as a rotating body that rotates coaxially with the rotation shaft member 16a of the hinge 16 when the first chassis 12 rotates relative to the second chassis 14. The side wall forming section 34 is formed in a jaw shape by a second half body 42, which is a part forming the lower side surface 12c of the rear cover member 28 and a first half body 44 facing the second half body 42. A substrate opening 34a is formed between the first half body 44 and the second half body 42. The substrate opening 34a is a slit-like opening that penetrates the side wall forming section 34. The first half body 44 is fixed at the left and right ends to a base 42c (refer to FIG. 3). In other words, the base 42C serves as a spacer between the first half body 44 and the second half body 42, and the substrate opening 34a is in the place where the base 42c is absent.

With the 0-degree posture illustrated in FIG. 5 defined as the reference, the side wall forming section 34 has the first half body 44 on the side facing the second chassis 14 with the substrate opening 34a sandwiched therebetween, and the second half body 42 on the opposite side thereto. The electronic apparatus 10 in the 0-degree posture is in a folded form in which the first chassis 12 and the second chassis 14 are stacked together, with the front surface 12a of the first chassis 12 opposing the upper surface 14a of the second chassis 14. In other words, the folded form means the 0-degree posture.

In the folded form, the substrate opening 34a extends in the direction in which the first chassis 12 and the second chassis 14 are stacked (the vertical direction in FIG. 5), one end thereof being a first opening 34aa, which is in communication with the first chassis 12, and the other end thereof being a second opening 34ab. The second opening 34ab faces the rear side surface 14c of the second chassis 14 according to the rotational movement of the first chassis 12. The first opening 34aa and the second opening 34ab are formed over the entire width between the pair of hinges 16, and the flexible substrates 32 can be arranged at any position within this range.

A part of the distal end of the side wall forming section 34 enters into the recessed portion 14d of the second chassis 14 according to the rotational movement of the first chassis 12. The flexible substrates 32 are pulled out of the first chassis 12 through the substrate opening 34a and then pulled into the second chassis 14 through the recessed portion 14d. The first half body 44 and the second half body 42 serve also as the covers that cover the flexible substrates 32.

The second half body 42 has a straight wall portion 42a that extends toward the front surface side from the end portion of the rear surface 12b and forms the lower side surface 12c, and a bent portion 42b that is bent slightly inward from the end portion of the wall portion 42a. The distal end portion of the bent portion 42b has a substantially semicircular shape. The second half body 42 is formed integrally with the rear cover member 28 so as to extend from the rear surface 12b to the lower side surface 12c. In the second half body 42, a semicircular proximal end portion 42ba, which is a substantially semicircular proximal end in the bent portion 42b, is closest to the profile of the rotation shaft member 16a of the hinge 16. Further, the left and right end portions of the second half body 42 are made integral with the end surfaces of the cylindrical bodies 16b (refer to FIG. 3). The bases 42c are formed at a plurality of locations including the left and right end portions of the second half body 42.

The first half body 44 has a front flat surface 44a facing a side of the second chassis 14 in the 0-degree posture and a rear curved surface (inner side surface) 44b facing the second half body 42. The front flat surface 44a is parallel to the lower side surface 12c and almost in contact with the rotation center C in a side view.

A distal end portion 44c of the first half body 44 is located near the rotation center C. More specifically, the rear curved surface 44b has an arc shape of a gentle ellipse, and a portion thereof beyond the point closest to the semicircular proximal end portion 42ba falls within the range of the profile of the rotation shaft member 16a. The rear curved surface 44b has an arc shape in which the diameter on the lower side (i.e., adjacent to the second opening 34ab) is smaller than the upper side (i.e., adjacent to the first opening 34aa) in FIG.

5. Further, the distal end portion 44c falls within the profile of the rotation shaft member 16a. Further, in a distance R between the rear curved surface 44b forming the inner side surface of the second opening 34ab and the rotation center C, the location of the distal end portion 44c has a shortest distance Ra. This means that, in the rear curved surface 44b, the location of the distal end portion 44c is the closest to the rotation center C. This configuration makes the distal end portion 44c sufficiently close to the rotation center C. The distal end portion 44c is moderately rounded and therefore does not scratch the flexible substrates 32.

The rear curved surface 44b of the first half body 44 has the elliptical arc shape, so that the first opening 34aa and the second opening 34ab both have a shape that gradually expands toward the opening direction. The substrate opening 34a forms a narrowest passage from the position of the height substantially in the middle of the wall portion 42a forming the lower side surface 12c to the semicircular proximal end portion 42ba.

The flexible substrates 32 are fixed by an adhesive tape 46 to a flat surface portion 42aa on the inner surface side of the wall portion 42a in a step before the first half body 44 is attached in the assembly process of the electronic apparatus 10. In other words, the flexible substrates 32 are fixed at positions sufficiently farther to the back than the second opening 34ab, thus allowing the flexible substrates 32 to freely move without being restricted in displacement within the second opening 34ab. In addition, the flat surface portion 42aa is flat, so that the fixing with the adhesive tape 46 is easy.

The flexible substrates 32 are fixed to the motherboard 26 in the second chassis 14 as described above. More specifically, each of the flexible substrates 32 has a connection portion 32a with respect to the motherboard 26 on the surface in the vicinity of an end portion in the second chassis 14. The connection portion 32a is a connector terminal to be connected to a connection part 26a provided on the bottom surface of the motherboard 26. Reference numeral 32b in FIG. 5 and FIG. 6 denotes a support plate for fixing the connection portion 32a to the flexible substrates 32.

In the second chassis 14, a space 14f having a moderate size is secured between the guide plate 14e and the motherboard 26. An area in the flexible substrates 32 from the guide plate 14e to the position of connection with the motherboard 26 forms a routing path having an S-shaped folded portion 32c for accommodating an excess length. The form of the folded portion 32c changes according to the rotation angle of the first chassis 12. A printed circuit board to which the flexible substrates 32 are connected may be a sub-board other than the motherboard 26. The flexible substrate 32A and the flexible substrate 32B may be connected to different printed circuit boards.

The rotational movement between the chassis 12 and 14 in the electronic apparatus 10 of the present embodiment and the operation and effect thereof will now be described.

In the 0-degree posture illustrated in FIG. 5, the electronic apparatus 10 is in the folded form in which the first chassis 12 and the second chassis 14 are stacked together with the front surface 12a of the first chassis 12 opposing the upper surface 14a of the second chassis 14.

In the 0-degree posture, the flexible substrates 32 are not visible, the rear side surfaces thereof being covered by the second half body 42. In addition, the second opening 34ab of the substrate opening 34a is directed diagonally downward and nearly hidden by the bent portion 42b, and therefore hardly visible to a user.

In the 0-degree posture, the substrate opening 34a extends in the vertical direction, and the distal end portion 44c of the first half body 44 can come in contact with the flexible substrates 32. Further, the flexible substrates 32 are guided upward from the second opening 34ab to the upper end of the guide plate 14e, so that the distal end portion 44c of the first half body 44 can be pressed such that the flexible substrates 32 protrude downward.

However, the distal end portion 44c of the first half body 44 falls within the range of the profile of the rotation shaft member 16a and is sufficiently close to the rotation center C, so that the amount of the downward protrusion is relatively small, thus preventing the flexible substrates 32 from being formed into an extreme downward convex shape. In addition, the flexible substrates 32 are guided along the path by the rear curved surface 44b, so that the bending by the distal end portion 44c is gentle. Further, in the 0-degree posture, the lower end surface of the rear curved surface 44b of the first half body 44 that continues to the distal end portion 44c is substantially horizontal, so that the flexible substrates 32 are guided to the front in a stressless manner.

Further, in the 135-degree posture illustrated in FIG. 6, the substrate opening 34a inclines downward toward the rear, and the second opening 34ab faces substantially straight up. However, the second opening 34ab is hardly visible from a user's viewpoint mainly because the rotation shaft member 16a is press-fitted into the cylindrical body 16b as described above, the rotation shaft member 16a is positioned relatively close to the second chassis 14, and the upper cover member 20 serves like a canopy. In other words, the rotation shaft member 16a is positioned relatively close to the second chassis 14, so that the first half body 44 having the function as the cover can be set to be relatively short. The flexible substrates 32 are sufficiently covered from below by the second half body 42 and are not visible.

In the 135-degree posture, the substrate opening 34a faces substantially straight up, so that the flexible substrates 32 are guided so as to form a gentle arc toward the upper end of the guide plate 14e from a distal end portion 42d of the second half body 42. The area including the distal end portion 42d in the bent portion 42b of the second half body 42 has a semicircular section so as not to apply stress to the flexible substrates 32.

Figure 7:
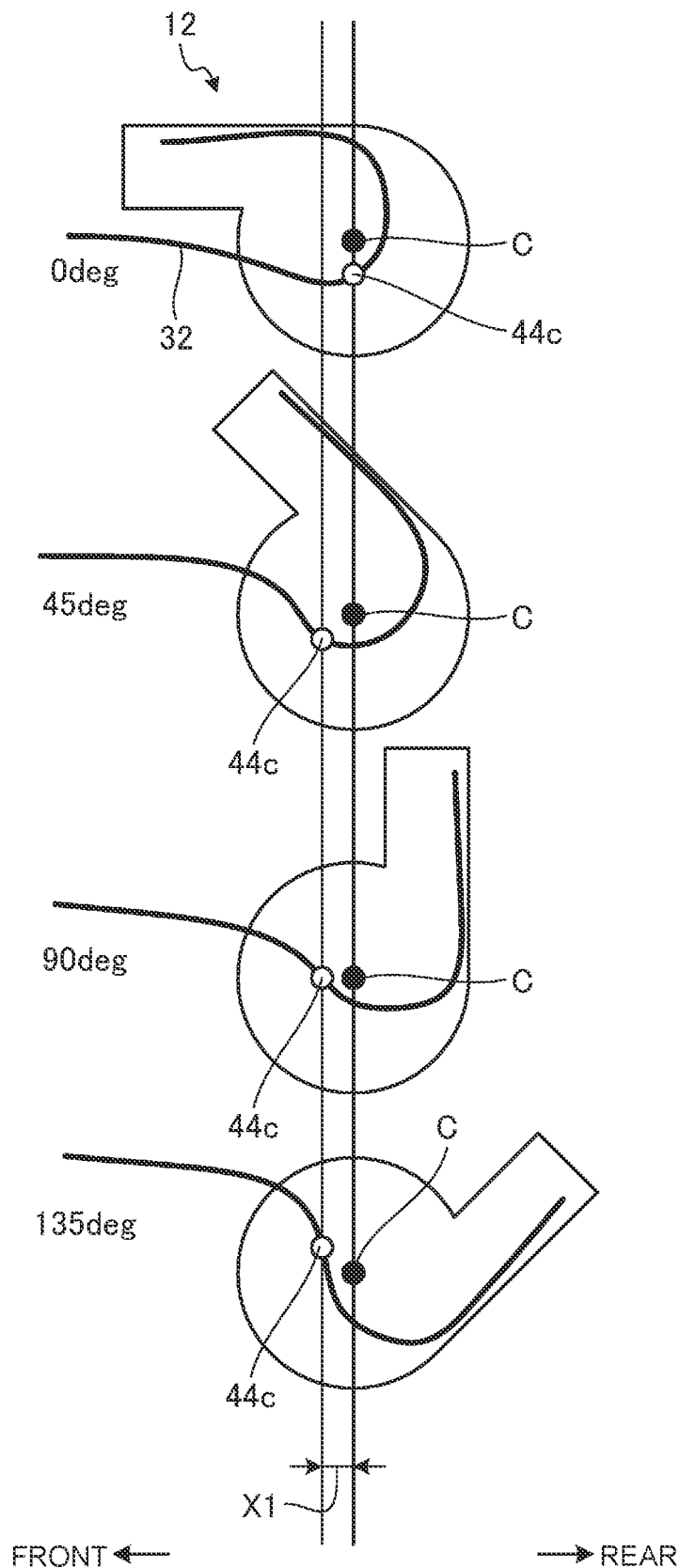
FIG. 7 presents schematic side views illustrating the paths of the flexible substrates when the rotation angles of the first chassis are 0 degrees, 45 degrees, 90 degrees, and 135 degrees in the present embodiment.
Figure 8:
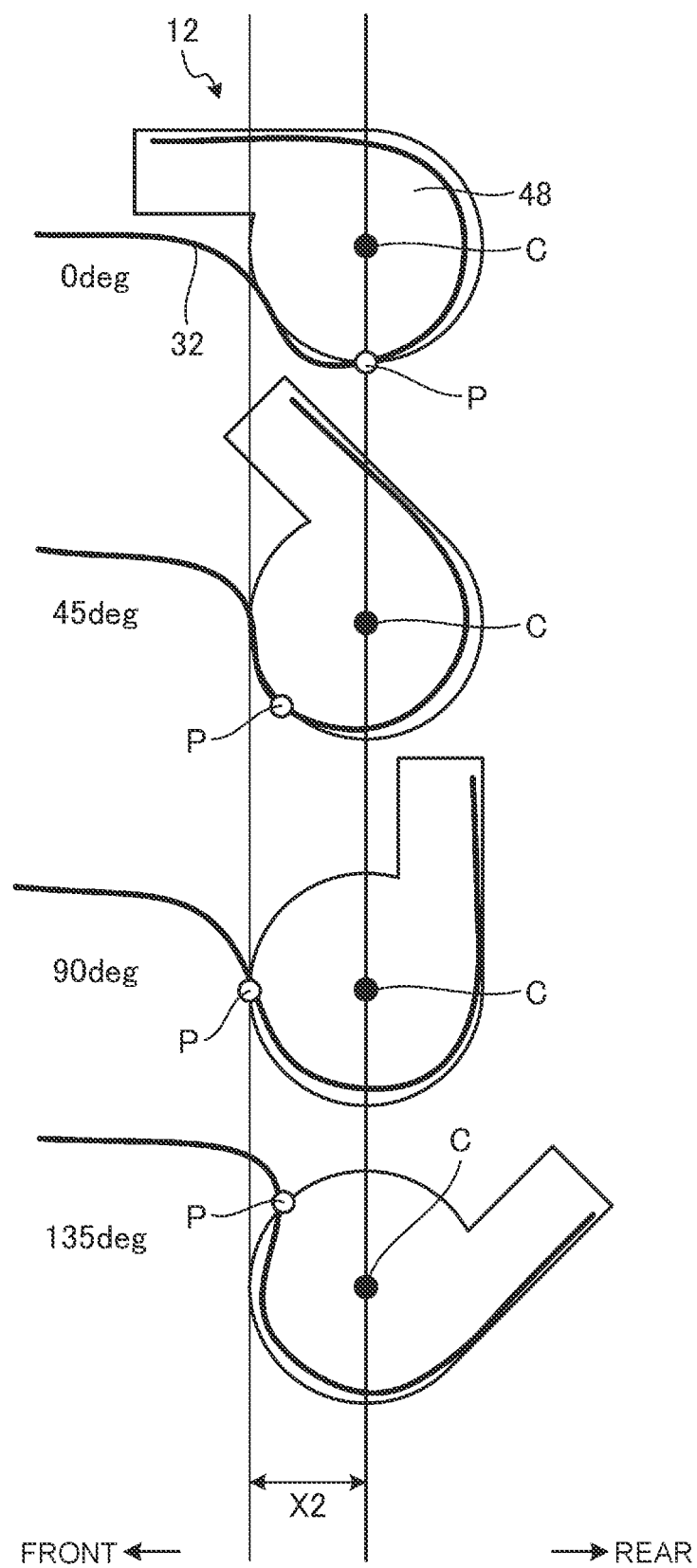
FIG. 8 presents schematic side views illustrating the paths of the flexible substrates when the rotation angles of the first chassis are 0 degrees, 45 degrees, 90 degrees, and 135 degrees in a comparative example.

FIG. 7 presents schematic side views illustrating the paths of the flexible substrates 32 when the rotation angles of the first chassis 12 are 0 degrees, 45 degrees, 90 degrees, and 135 degrees in the present embodiment. FIG. 8 presents schematic side views illustrating the paths of the flexible substrates 32 when the rotation angles of the first chassis 12 are 0 degrees, 45 degrees, 90 degrees, and 135 degrees in a comparative example.

When the rotation angle of the first chassis 12 is zero degrees, the flexible substrates 32 are in contact with the distal end portion 44c of the first half body 44 as described with reference to FIG. 5. Further, when the first chassis 12 rotates, the flexible substrates 32 are subjectively restricted in path by the distal end portion 44c. For easy understanding, FIG. 7 illustrates the change in path, assuming that the flexible substrates 32 are virtually fixed at the distal end portion 44c.

When the first chassis 12 rotates, the portions of the flexible substrates 32 that are in contact with the distal end portion 44c rotate together with the distal end portion 44c. However, the distal end portion 44c is located sufficiently close to the rotation center C, so that the amount of displacement thereof is small, and a maximum displacement amount X1 in the longitudinal direction of the distal end portion 44c with reference to the 0-degree posture is sufficiently small. In addition, a change in the path angle of the flexible substrates 32 is also small. Thus, the flexible substrates 32 undergo small changes in posture and position caused by the repeated rotation of the first chassis 12, and are therefore less subject to stress and do not shorten the service lives thereof.

Further, since the flexible substrates 32 undergo small path changes in the longitudinal direction, the amounts of the flexible substrates 32 moving in and out of the space 14f are small, and therefore, the required amount of excess length to be accommodated is small, so that the space 14f that houses the folded portion 32c for accommodating the excess length (refer to FIG. 5 and FIG. 6) can be made relatively narrow. In FIG. 7, it is assumed that the flexible substrates 32 are virtually fixed at the distal end portion 44c, but in reality, the flexible substrates 32 can freely move without difficulty inside the second opening 34ab with a widened tip, so that the flexible substrates 32 undergo an even smaller posture change. In FIG. 7, a part corresponding to a columnar body 48 of FIG. 8 is illustrated for easy comparison with FIG. 8.

In the comparative example illustrated in FIG. 8, it is assumed that the flexible substrates 32 are in contact at a fixed point P of the columnar body 48 with reference to the rotation center C. In the 0-degree posture, the fixed point P is below the rotation center C. However, the radius of the columnar body 48 (i.e., the distance between C and P) is to be longer than the distance between the rotation center C and the distal end portion 44c. In this case, when the first chassis 12 rotates, the portions of the flexible substrates 32 that are in contact with the fixed point P rotate together with the fixed point P, and a maximum displacement amount X2 in the longitudinal direction of the fixed point P with reference to the 0-degree posture increases to a certain degree. In addition, the changes in the path angles of the flexible substrates 32 also increase. This means that, in such a comparative example, there is a concern that the changes in posture and position that the flexible substrates 32 undergo increase as the first chassis 12 is repeatedly rotated, and the service lives thereof are shortened due to stress. As described above, the electronic apparatus 10 according to the present embodiment does not have such an inconvenience.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10 electronic apparatus
12 first chassis
14 second chassis
14d recessed portion
14e guide plate
14f space
16 hinge
16a rotation shaft member
16b cylindrical body
18 display
26 motherboard (printed circuit board)
30 electrical device
32, 32A, 32B flexible substrate
34 side wall forming section
34a substrate opening
34aa first opening
34ab second opening
42 second half body
42a wall portion
42b bent portion
42ba semicircular proximal end portion
42d distal end portion
44 first half body
44a front flat surface
44b rear curved surface (inner side surface)
44c distal end portion
C rotation center

What is claimed is:

1. An electronic apparatus comprising:
a first chassis and a second chassis;
a hinge connecting the second chassis to the first chassis in a relatively rotatable manner;
an electrical device including a display provided in the first chassis;
a printed circuit board provided in the second chassis; and
a flexible substrate for electrically connecting the electrical device and the printed circuit board, wherein
the first chassis includes: a rotating body that rotates coaxially with the hinge by a rotational movement with respect to the second chassis and has the flexible substrate passed therethrough,
the rotating body includes: a first opening guiding the flexible substrate to the electrical device; a second opening guiding the flexible substrate to the printed circuit board; and a substrate opening through which the flexible substrate passes,
the substrate opening extends in a direction in which the first chassis and the second chassis are stacked in a folded form in which the first chassis and the second chassis are stacked together with one surface of each thereof opposing each other, and the rotating body has a first half body on a side facing the second chassis with the substrate opening sandwiched therebetween, and a second half body on a side opposite thereto, and
a distal end portion forming the second opening in the first half body falls within a range of a profile of a rotation shaft member in a side view of the distal end portion observed on an extension of the rotation shaft member providing a center of rotation of the hinge.

2. An electronic apparatus comprising:
a first chassis and a second chassis;
a hinge connecting the second chassis to the first chassis in a relatively rotatable manner;
an electrical device including a display provided in the first chassis;
a printed circuit board provided in the second chassis; and
a flexible substrate for electrically connecting the electrical device and the printed circuit board, wherein
the first chassis includes: a rotating body that rotates coaxially with the hinge by a rotational movement with respect to the second chassis and has the flexible substrate passed therethrough,
the rotating body includes: a first opening guiding the flexible substrate to the electrical device; a second opening guiding the flexible substrate to the printed circuit board; and a substrate opening through which the flexible substrate passes,
the substrate opening extends in a direction in which the first chassis and the second chassis are stacked in a folded form in which the first chassis and the second chassis are stacked together with one surface of each thereof opposing each other, the rotating body has a first half body on a side facing the second chassis with the substrate opening sandwiched therebetween, and a second half body on a side opposite thereto, and an inner side surface forming the second opening in the first half body has a distal end portion thereof closest to the center of rotation.

3. The electronic apparatus according to claim 1, wherein the second half body constitutes a side surface of the first chassis, and the flexible substrate is fixed to an inner surface of a straight wall portion of the second half body, the straight wall portion forming a side surface of the first chassis.

4. The electronic apparatus according to claim 1, wherein the rotation shaft member is press-fitted into a part of the first chassis.

* * * * *